UNITED STATES PATENT OFFICE.

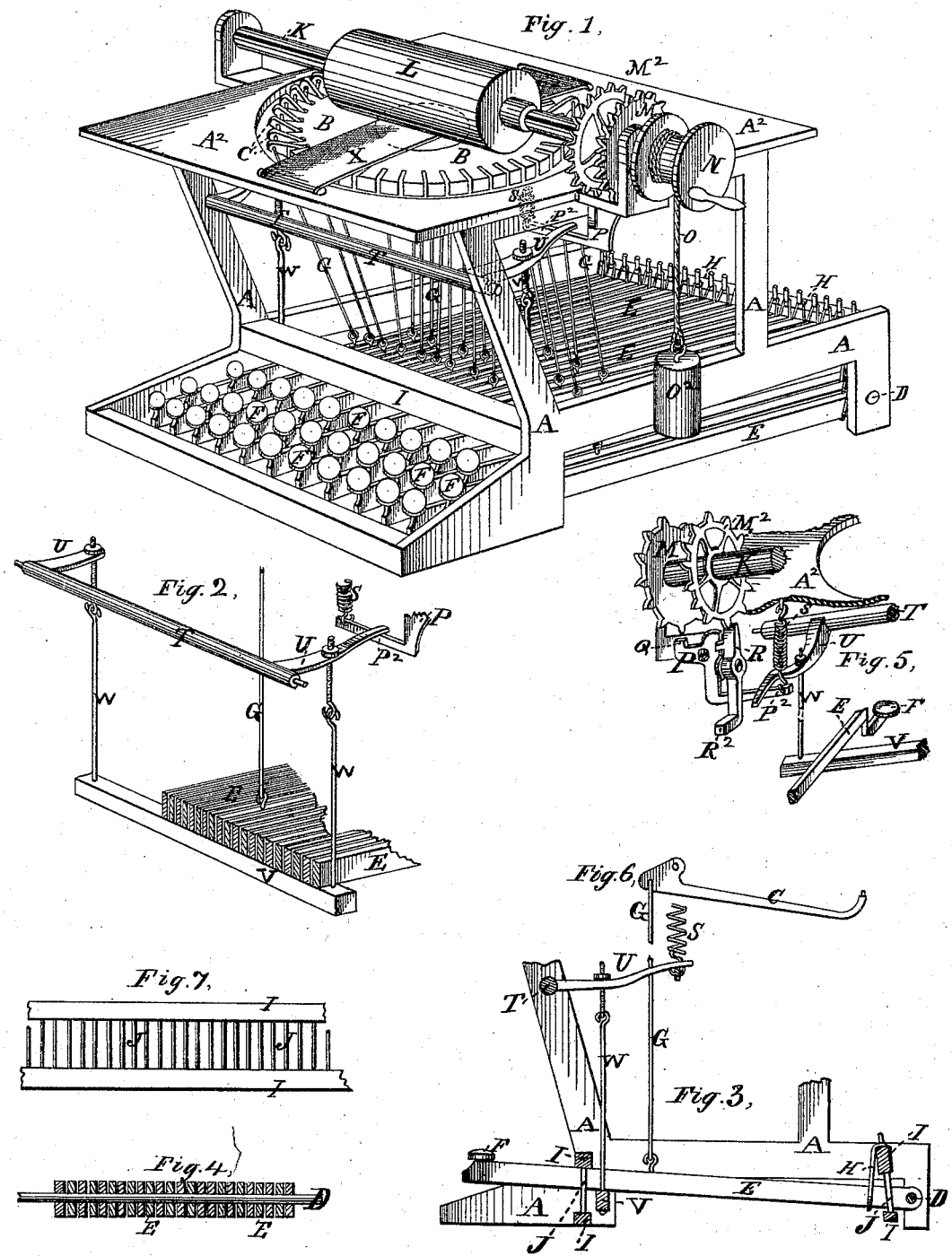

C. LATHAM SHOLES AND MATTHIAS SCHWALBACH, OF MILWAUKEE, WIS., ASSIGNORS TO THE TYPE WRITER COMPANY, OF NEW YORK CITY.

IMPROVEMENT IN TYPE-WRITING MACHINES.

Specification forming part of Letters Patent No. 182,511, dated September 19, 1876; application filed March 30, 1872.

*To all whom it may concern:*

Be it known that we, C. LATHAM SHOLES and MATTHIAS SCHWALBACH, of Milwaukee, Wisconsin, have invented Improvements in Type-Writing Machines, of which the following is a specification:

The invention relates to that class of type-writing machines which, by depressing and releasing a series of pivoted key-levers one after another, and thereby vibrating a series of pivoted type-bars and throwing the types thereof against an inking substance and the substance to be written on, and, after each type-bar has been thrown against it, and while the key-lever and type-bar are going back to place, moving such substance written on a type-space distance, will write or print one letter or character at a time.

The nature of the invention is as follows: First, in combining a series of connecting wires or ligaments with a series of type-bars of a type-writing machine, pivoted and set so they may vibrate and all strike at the same place, and with a series of pivoted key-levers, each provided with a pivot at one end and a key on the other, by attaching each connecting wire or ligament directly to the outer end of a type-bar, and also directly to a point between the pivot and key of a key-lever; second, in combining the key-levers of a type-writing machine, each provided with a pivot at one end and a key on the other, with a guide rack or reed, composed of a series of parallel pins or wire in a vertical plane, each attached to two horizontal cross-bars in the same plane, one over and one under the key-levers; third, in combining the letter-space ratchets and key-levers of a type-writing machine, each key-lever provided with a pivot at one end and a key on the other, with a vibratory frame composed of a vibratory bar or arm attached to each end of a connecting-bar pivoted in line across over the key-levers so they may vibrate in vertical planes, of a pendent bar across, under, and up next the key-levers, and of a connecting wire or ligament attached to each end of the pendent cross-bar and to the corresponding vibratory bar above; fourth, in combining a lifting-spring with the letter-space ratchets and key-levers of a type-writing machine, each key-lever provided with a pivot at one end and a key on the other, and with the vibratory frame composed of a vibratory bar or arm attached to each end of a connecting-bar pivoted in line across over the key-levers so they may vibrate in vertical planes, of a pendent bar across, under, and up next the key-levers, and of a connecting wire or ligament attached to each end of the pendent cross-bar and to the corresponding vibratory bar above.

The accompanying drawing and following description fully illustrate the invention.

The figures of the drawing represent views as follows: Figure 1, a view of a type-writing machine; Figs. 2 and 3, views of the vibratory frame and key-levers; Fig. 4, a view of the key-lever pivot-bar; Fig. 5, a view of the letter-space ratchets and ratchet-wheels; Fig. 6, a view of a type-bar and connecting-wire; and Fig. 7, a view of the key-lever guide rack or reed.

The description is as follows: A represents a side plate of the main frame of a type-writing machine; $A^2$, a top-plate on the side-plates A; B, a radially-slotted annular disk within an aperture of the top-plate $A^2$; C, a series of type-bars, pivoted in the radial slots to the annular disk B; D, a pivot-rod, attached across near the bottom of the back part of the side plates A; E, a series of key-levers in a horizontal plane, and pivoted on the pivot-rod D and extended through to the front part of the main frame A $A^2$; F, a key on the fore end of each pivoted lever E; G, a connecting wire or ligament attached directly to the outer end of each type-bar C, and also directly to a key-lever, F E, at a point between the pivot D and key F; H, a spring, attached to each key-lever F E, forward of the pivot-rod D, and to a cross-bar attached to the side plates A above the pivot-rod; I, a horizontal bar, attached to the side plates A across, both above and below the key-levers F E; J, a guide pin or wire, vertically between each two contiguous key-levers F E, and attached to each cross-bar I; K, a long shaft or main axle in bearings on the top plate $A^2$, across over the middle of the annular disk B; L, a cylinder on the main axle K, and attached so as both to turn with and slide along on the axle; M, a ratchet-wheel on near one end of the main axle K; $M^2$, another ratchet-wheel on the main axle K, near the first ratchet-wheel M; N, a pulley on the end of the main axle K, and attached so as to turn loosely on the axle in one direction, but to engage and turn with the axle in the other direction; O, a cord, attached to the pulley N; $O^2$, a weight, attached to the other end of the cord O; P, a walking-beam, attached to an arm of the top plate $A^2$ under the main axle K, and pivoted in a line vertically midway between the ratchet-wheels M $M^2$, so it may vibrate in a plane parallel with the line of the main axle; $P^2$, an arm, attached to the walking-beam, and extended to and within the main frame A $A^2$; Q, a ratchet, integrally a part of or rigidly attached to the outer end of the walking-beam P, so it may vibrate into the notches of the outer ratchet-wheel M; R, another ratchet, attached to the walking-beam P, so it may vibrate into the notches of the inner ratchet-wheel $M^2$, and pivoted so it may vibrate independently in a plane at a right angle to line of the main axle K; $R^2$, a weighted end, attached, below the pivot, to the twofold vibratory ratchet R, to vibrate it independently; S, a lifting spring, attached to the top plate $A^2$ and to the inner end of the walking-beam arm $P^2$; T, a bar, attached within the main frame A $A^2$, and pivoted in line across over the key-levers F E; U, a vibratory bar or arm, attached to each end of the pivoted bar T, and extended inwardly, so they may vibrate in planes parallel with the key-levers F E, and one of which is extended over so as to rest on the inner end of the walking-beam arm $P^2$; V, a pendent bar, across, under, and next the key-levers F E; W, a connecting wire or ligament, attached to each end of the pendent cross-bar V and to the corresponding vibratory bar U; and X, an inking ribbon, to be on spools in front and rear within the main frame A $A^2$, and extended up through the top plate $A^2$ and over the center of the annular disk B and the striking point of the type-bars C, and under the cylinder L. The function of the key-levers F E and connecting wires or ligaments G is to vibrate the type-bars C; and by using long levers of this order pivoted at the back part and extended through to the front part of the main frame A $A^2$, it is practicable to use the connecting wires or ligaments G attached directly to the type-bars C and to the key-levers F E, and dispense with all intermediate levers which heretofore have been used. The function of the guide rack or reed I J is to keep each key-lever F E exactly in place, and yet give perfect freedom of action. The function of the vibratory frame T U V W is to vibrate the walking-beam $P^2$ P and letter-space ratchets Q R $R^2$ whenever a key-lever, F E, is depressed. By striking a key, F, and depressing its lever E the lever will strike and depress the pendent cross-bar V and vibratory bars U, one of which will strike and depress the inner end of the walking-beam arm $P^2$, which will vibrate the walking-beam P in one direction, and simultaneously draw the limber or twofold vibratory ratchet R out of a notch of the inner ratchet-wheel $M^2$, and throw the stiff or onefold vibratory ratchet Q into a notch of the outer ratchet-wheel M; and the function of the lifting-spring S is to vibrate the walking-beam $P^2$ P and combined ratchets Q R $R^2$ whenever a key-lever, F E, is released from depression. The depression of the vibratory bars U and inner end of the walking-beam arm $P^2$ will draw down the lifting-spring S, so that when the key-lever F E is released, and while going back to place, the spring will draw up the inner end of the walking-beam arm $P^2$ and the vibratory frame T U V W back to place, and vibrate the walking-beam P in the reverse direction, and again simultaneously throw the limber ratchet $R^2$ again into a notch of the inner ratchet-wheel $M^2$, and draw the stiff ratchet Q again out of the notch of the outer ratchet-wheel M.

The former vibration of the walking-beam P and combined ratchets Q R is made while the key-lever F E is depressed and the type-bar C thrown to the striking-point, and the stiff ratchet Q will hold the main axle K and cylinder L from moving while the type strikes against the inking-ribbon X and the paper or substance to be written on wrapped round the cylinder L, and impresses a letter or character; and the latter vibration is made while the key-lever F E and type-bar C are going back to place, and, when released from the inner ratchet-wheel $M^2$, the weighted arm $R^2$ of the limber ratchet R will cause the ratchet to vibrate on its own independent axis and reach back a notch-space distance, so when the walking-beam P is again vibrated the ratchet will go into the next notch of the ratchet-wheel, which will allow the weight and cord $O^2$ O to turn the main axle K and cylinder L, and move the paper or substance written on a ratchet-notch distance, which is a type-space or letter-space distance.

The function of the weight and cord $O^2$ O and ratchet-wheels M $M^2$ and combined ratchets Q R $R^2$ is to hold the cylinder L and substance to be written on from moving while a type-bar, C, is vibrated, and a letter or character impressed, and to turn the cylinder and move the substance written on a letter-space distance while the type-bar is going back to place; and the combined ratchets Q R $R^2$ are called the "letter-space" ratchets.

We, therefore, claim as follows:

1. The combination of a series of connecting wires or ligaments with a series of type-bars of a type-writing machine, pivoted and set so they may vibrate and all strike at the same place, and with a series of pivoted key-levers, each provided with a pivot at one end and a key on the other, by the attachment of each connecting wire or ligament directly to the outer end of a type-bar, and directly to a point between the pivot and key of a key-lever, substantially as described.

2. The combination of a series of key-levers of a type-writing machine, each provided with a pivot at one end and a key on the other, with a guide rack or reed composed of a wire or pin between each two contiguous key-levers and attached to a cross-bar, both above and below the key-levers, substantially as described.

3. The combination of the key-levers and letter-space ratchets of a type-writing machine with a vibratory frame composed of a vibratory bar or arm attached to each end of a connecting-bar, pivoted in line across over the key-levers, of a pendent cross-bar, under and next the key-levers, and of a connecting wire or ligament attached to each end of the under cross-bar and to the corresponding vibratory bar above, substantially as described.

4. The combination of a lifting-spring with the letter-space ratchets and key-levers of a type-writing machine, each key-lever provided with a pivot at one end and a key on the other, and with the vibratory frame composed of a vibratory bar or arm attached to each end of a connecting-bar pivoted in line across over the key-levers, of a pendent cross-bar under and next the key-levers, and of a connecting wire or ligament attached to each end of the pendent cross-bar, and to the corresponding vibratory bar above, substantially as described.

C. LATHAM SHOLES.
MATTHIAS SCHWALBACH.

Witnesses:
W. SCHMIDT,
C. H. MEYER.